United States Patent
Nevill et al.

(10) Patent No.: US 11,543,864 B2
(45) Date of Patent: Jan. 3, 2023

(54) SPEAKER ASSEMBLY FOR ELECTRONIC DEVICE

(71) Applicant: Apple Inc., Cupertino, CA (US)

(72) Inventors: Stuart M. Nevill, Los Gatos, CA (US); Andreas Rousounelos, San Jose, CA (US); Kieran Poulain, San Francisco, CA (US); Martial A. Rousseau, Saratoga, CA (US); Daniel W. Corona, Cupertino, CA (US); Alix V. McCabe, San Francisco, CA (US); Michael S. Browne, Cupertino, CA (US); Bao Liu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 173 days.

(21) Appl. No.: 16/938,766

(22) Filed: Jul. 24, 2020

(65) Prior Publication Data

US 2022/0026964 A1 Jan. 27, 2022

(51) Int. Cl.
  *H04R 1/02* (2006.01)
  *G06F 1/16* (2006.01)
  *H04R 7/20* (2006.01)

(52) U.S. Cl.
  CPC .......... *G06F 1/1688* (2013.01); *H04R 1/021* (2013.01); *H04R 1/025* (2013.01); *H04R 7/20* (2013.01); *H04R 2400/03* (2013.01); *H04R 2499/11* (2013.01); *H04R 2499/15* (2013.01)

(58) Field of Classification Search
  CPC .......... H04R 1/021; H04R 1/025; H04R 5/02; H04R 7/20; H04R 2400/03; H04R 2499/11; H04R 2499/13; H04R 2499/15; G06F 1/1688
  See application file for complete search history.

(56) References Cited

U.S. PATENT DOCUMENTS

| | | | | | |
|---|---|---|---|---|---|
| 5,689,574 | A | * | 11/1997 | Heirich | H04R 5/02 381/345 |
| 5,956,412 | A | * | 9/1999 | Park | H04N 5/642 381/388 |
| 6,504,939 | B1 | * | 1/2003 | Fukuda | H04R 1/021 381/345 |
| 6,760,460 | B1 | * | 7/2004 | Jeon | H04N 5/642 381/388 |
| 2008/0031485 | A1 | * | 2/2008 | Yu | H04R 1/025 381/386 |
| 2010/0054522 | A1 | | 3/2010 | Maurer et al. | |
| 2018/0067523 | A1 | | 3/2018 | Thomason | |

FOREIGN PATENT DOCUMENTS

CN 203523034 U 4/2014

* cited by examiner

*Primary Examiner* — Huyen D Le
(74) *Attorney, Agent, or Firm* — BakerHostetler

(57) ABSTRACT

Systems of the present disclosure include an electronic device with a chassis and a speaker assembly. The speaker assembly can include a speaker support surrounding a speaker and coupled to the chassis via a spring element. The spring element can be monolithically formed with a main body of the speaker support and be configured to reduce transmission of vibrations from the speaker to the chassis. For example, the spring element can include an arm that extends within an opening of the main body to connect the main body to a fastener secured to the chassis. The spring element can be provided with features that facilitate wide distribution of loads and relative movement between the speaker assembly and the chassis.

18 Claims, 2 Drawing Sheets

SPEAKER ASSEMBLY FOR ELECTRONIC DEVICE

TECHNICAL FIELD

The present description relates generally to assemblies for electronic devices, and, more particularly, to speaker assemblies for electronic devices.

BACKGROUND

Design, heft, ease of portability, and overall aesthetic appearance are factors that many users consider when choosing an electronic device for personal use. At the same time, the assembly and overall functionality of the electronic device are also important to the user, since a durable assembly can extend the overall life of the device and thus increase its value to the user. Various factors that can be considered in the design of electronic device components can include weight, strength, durability, cosmetic appearance, manufacturability, and performance, among others.

One design challenge associated with the manufacture of electronic devices is the assembly of parts that provide different functions into a compact form factor. This design challenge generally arises from a number of conflicting design goals that include the performance of separate components and the user experience while interacting with the electronic device. While many designs and techniques used to provide assemblies for electronic devices have generally worked well in the past, there is always a desire to provide further designs and techniques for alternative aesthetically pleasing yet mechanically strong and lightweight electronic device assemblies.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
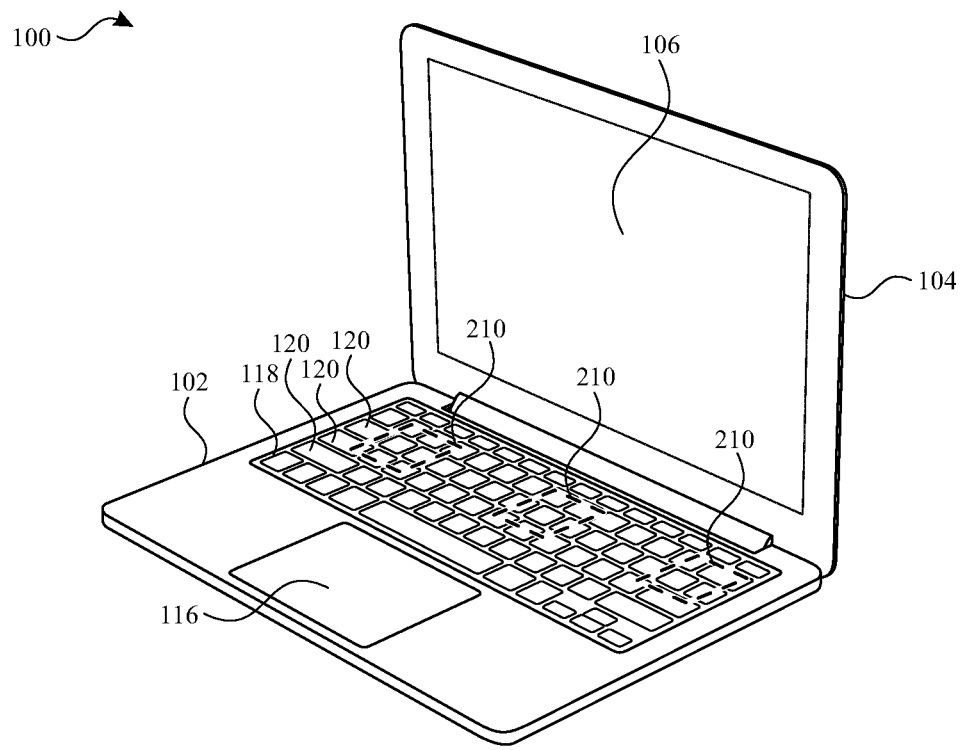
FIG. 1 illustrates a perspective view of an electronic device in an open state, in accordance with some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Embodiments described herein include assemblies for electronic devices, such as laptop computers, netbook computers, tablet computers, and the like. In some embodiments, audio system architectures can include positioning one or more speakers beneath a keyboard such that sound is directed through gaps between keys and/or the body. Vibrations generated by the speaker can be managed so that transmission of such vibrations to other components is reduced.

During operation, a speaker mounted within an electronic device may move in a manner that generates vibrations. At the same time, a user may operate a keyboard or another component of the electronic device by physically contacting such a component. The vibrations generated by speaker motion can tend to be transmitted throughout the electronic device. It can be desirable to reduce or eliminate transmission of such vibrations so that they are not perceptible by a user while in contact with the electronic device. It can also be desirable to achieve such results with an arrangement that minimizes cost in terms of components and time for assembly.

Systems of the present disclosure can provide an electronic device with a chassis and a speaker assembly. The speaker assembly can include a speaker support surrounding a speaker and coupled to the chassis via a spring element. The spring element can be monolithically formed with a main body of the speaker support and be configured to reduce transmission of vibrations generated by the speaker into other components. For example, the spring element can include an arm that extends within an opening of the main body to connect the main body to a fastener secured to the chassis. The spring element can be provided with features that facilitate wide distribution of loads and relative movement between the speaker assembly and the chassis. With such an arrangement, the speaker assembly can operate from within the laptop (e.g., beneath the keyboard) to generate sound without propagating excessive vibrations throughout the laptop.

These and other embodiments are discussed below with reference to FIGS. 1-4. However, those skilled in the art will readily appreciate that the detailed description given herein with respect to these Figures is for explanatory purposes only and should not be construed as limiting.

Embodiments described herein can relate to assemblies for an electronic device such as a laptop computer, netbook computer, tablet computer, and the like. In some embodiments, audio system architectures can include positioning one or more speakers beneath the keyboard assembly such that sound is directed through gaps between keys and/or the housing. Vibrations generated by the speaker can be managed so that transmission to other components is reduced.

Referring first to FIG. 1, an exemplary electronic device in an open state is illustrated in right side front facing perspective view. An electronic device 100 can include a body 102 and a lid 104 having a display 106. The lid 104 can be moved by a user from a closed position to an open position as shown. A display 106 can display visual content such as a graphical user interface, still images such as photos as well as video media items such as movies. The display 106 can display images using any appropriate technology such as a liquid crystal display ("LCD"), organic LCD ("OLCD") and the like. The lid 104 can be coupled to the body 102 using a hinge assembly.

The body 102 can include a number of user input devices such as a touch pad 116 and a keyboard 118. The keyboard 118 can include multiple keys 120 each having a symbol imprinted thereon for identifying to a user the key input associated with the particular key. The keyboard 118 can be arranged to receive a discrete user input at each key using a finger motion referred to as a keystroke. In the described embodiment, the symbols on each key can be laser etched thereby creating an extremely clean and durable imprint that will not fade under the constant application of keystrokes over the life of the electronic device 100. The touch pad 116 can be configured to receive a user's finger gesturing. A finger gesture can include touch events from more than one finger applied in unison. The gesture can also include a single finger touch event such as a swipe or a tap.

The electronic device 100 of FIG. 1 further includes speakers 210 within the body 102. The speakers 210 are operable as audio sources to emit sound waves, such as music and sounds, associated with various applications that can be executed on the electronic device 100. The sound waves can be transmitted to a user through the keyboard 118. Three speakers 210 emitting sound waves are shown in the FIG. 1 for purposes of illustration, although it will be readily appreciated that more or fewer speakers may be used, as desired. The speakers 210 can include one or more piezoelectric speakers, one or more cone-type speakers, and/or one or more speakers of another type.

The gaps between the keys of the keyboard 118 allow sound waves generated within the body 102 to be propagated away from the electronic device 100. In other embodiments, other apertures in the body 102 can be used to provide an audio propagation path from the interior of the body to the exterior. For example, vents used for air cooling of the processor can also be used to propagate sound waves from the interior of the body 102.

One advantage of using the gaps between the keys of the keyboard 118 as a path for propagating sound waves can be that additional apertures do not have to be added to the body 102 for the purposes of sound propagation. The removal of dedicated apertures for sound propagation purposes can provide a design that is considered more aesthetically pleasing. In addition, manufacturing costs can be reduced since the machining of body 102 is reduced. Further, the removal of the dedicated apertures can eliminate potential entry points for dust and liquid that can adversely affect the electrical components housed within the body 102.

Figure 2:
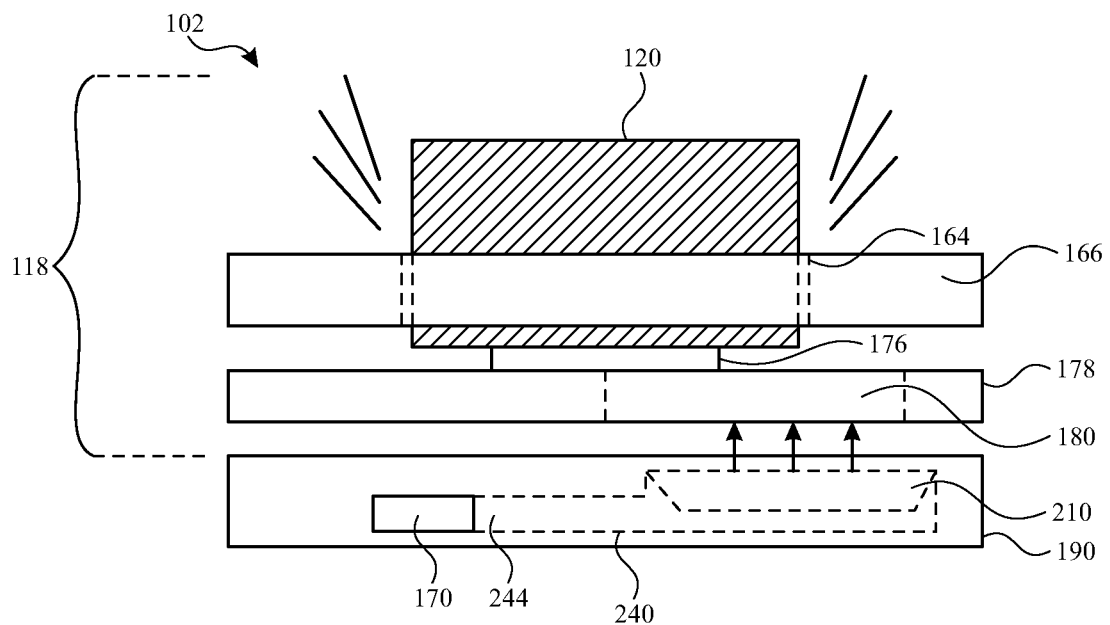
FIG. 2 illustrates a side cross-sectional view of an exemplary keyboard assembly having a speaker disposed there beneath, in accordance with some embodiments of the present disclosure.

Referring now to FIG. 2, is a cross section of an assembly for a keyboard and a speaker disposed below the keyboard. As shown in FIG. 2, a key 120 mounted to a support structure 176 is attached to the keyboard substrate 178. The key 120 can be actuated towards the keyboard substrate 178 by applying a force to the top surface of the key 120. An opening 164 slightly larger than the key 120 is provided in an outer layer 166 of the body 102 to accommodate actuation of the key 120.

In some embodiments, a speaker assembly 200, including a speaker 210, can be disposed below the keyboard substrate 178. The speaker assembly 200 is shown in FIG. 2 as being located on and/or in a chassis 190 for the purposes of illustration and is not limited to this location. In some embodiments, the speaker assembly 200 can be integrated into the keyboard 118, such as integrated into or mounted to the keyboard substrate 178. Further, a speaker assembly 200 can be located below various keys 120 in the keyboard 118 and is not limited to a particular key location.

When the speaker 210 is mounted below the keyboard assembly, the keyboard substrate 178 of the keyboard 118 can include an opening 180 located above the speaker 210 to provide an audio transmission path for the sound waves generated by the speaker 210 and through the keyboard substrate 178. In various embodiments, one or more openings 180 through the keyboard substrate 178 can be provided, such as a number of small openings or a single large opening.

The speaker assembly 200 can provide a speaker support 240 that supports the speaker 210. The speaker support 240 can be mounted to the chassis 190 or another component of the body 102 of the electronic device, as discussed further herein. The speaker support 240 can surround at least a portion of the speaker and direct the speaker 210 in a direction away from a portion of the speaker support 240 (e.g., toward the keyboard 118).

In some embodiments, the speaker support 240 can optionally provide a chamber 244, such as a tube, that can be connected to the speaker 210 to enhance (e.g., amplify) one or more sound wave frequencies emitted from the speaker 210. The chamber 244 can include or be connected to an exit port 170. While the primary direction of emitted sound waves from the speaker 210 can directed to the keyboard 118, the exit port 170 associated with chamber 244 can be aligned with vents (e.g., vents used to provide air circulation and cooling to the main logic board located on a side of the body 102).

As shown in FIG. 2, after sound waves are emitted from speaker 210, the sound waves can propagate through various paths within the body 102 of the electronic device. For instance, sound waves can propagate along paths from the driver of speaker 210, through a gap between the chassis 190 and the keyboard substrate 178 of the keyboard 118, through one or more openings 180 in the keyboard substrate 178 of the keyboard 118, through a gap between the keyboard substrate 178 of the keyboard 118 and the outer layer 166 of the body 102, and exit the body 102 between openings 164 between one or more keys 120 and the outer layer 166.

As further shown in FIG. 2, a primary direction of the sound waves emitted from the speaker 210 can be parallel to the alignment of the opening 164 (e.g., parallel to the actuation direction of one or more keys 120) and perpendicular to a top surface of the speaker support 240 and/or a top surface of the key 120. In other embodiments, the primary direction 184 can be in other directions.

During operation, the speaker 210 may move in a manner that generates vibrations. For example, the speaker 210 can move while it is supported by the speaker support 240 of the speaker assembly 200. The vibrations generated by speaker motion can tend to be transmitted throughout the body 102 of the electronic device. It can be desirable to reduce or eliminate transmission of such vibrations so that they are not perceptible by a user while in contact with the electronic device. In particular, vibrations generated by a speaker 210 may be transmitted to a user operating the keyboard 118 if such vibrations are not managed.

Figure 3:
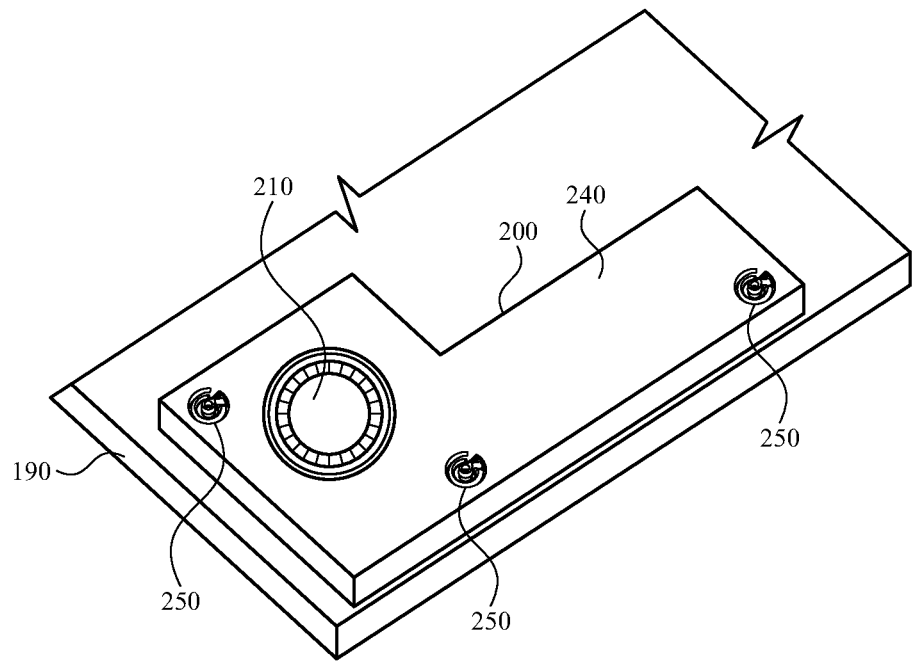
FIG. 3 illustrates a perspective view of a speaker assembly coupled to a chassis of an electronic device, in accordance with some embodiments of the present disclosure.

Referring now to FIG. 3, an electronic device can be provided with a speaker assembly that is coupled to a chassis or other component by a spring element that isolates the speaker assembly from other components to manage transmission of vibrations generated by the speaker of the speaker assembly. As shown in FIG. 3, a chassis 190 can extend within or along a side of the electronic device. As used herein, a chassis 190 is any component that provides a support, platform, mounting, substrate, or surface for coupling a speaker assembly 200 thereto. It will be understood that a chassis 190 can couple the speaker assembly 200 to one or more other components. It will be further understood that the chassis 190 can be a portion of another component (e.g., keyboard) to which the speaker assembly 200 is directly coupled.

As further shown in FIG. 3, the speaker assembly 200 can include a speaker support 240 that extends along (e.g., parallel to) at least a portion of the chassis 190. The speaker support 240 can surround at least a portion of the speaker 210. For example, the speaker support 240 can attach to the speaker 210 on two or more opposing sides thereof. By further example, the speaker support 240 can extend around and attach to an entire peripheral edge of the speaker 210. The speaker support 240 can optionally leave the speaker 210 uncovered on top and/or bottom surfaces thereof.

The speaker support 240 can include multiple spring elements 250 that facilitate coupling of the speaker assembly 200 to the chassis 190. While the speaker support 240 of FIG. 3 is shown with three spring elements 250, it will be understood that any number of spring elements 250 can be provided. For example, the spring elements 250 can be provided in sufficient quantity and in an arrangement to secure to the chassis 190. Each of the spring elements 250 can be secured to the chassis 190 and/or one or more other components, for example, by corresponding fasteners.

The speaker assembly 200 can be secured to the chassis 190 and any other components of the electronic device via only the spring elements 250. Accordingly, transmission of vibrations generated by the speaker 210 of the speaker assembly 200 can be reduced by the spring elements 250. Accordingly, transmission of vibrations generated by the speaker 210 are reduced rather than allowing vibrations to be fully transmitted to the chassis 190 or any other components of the electronic device.

Figure 4:
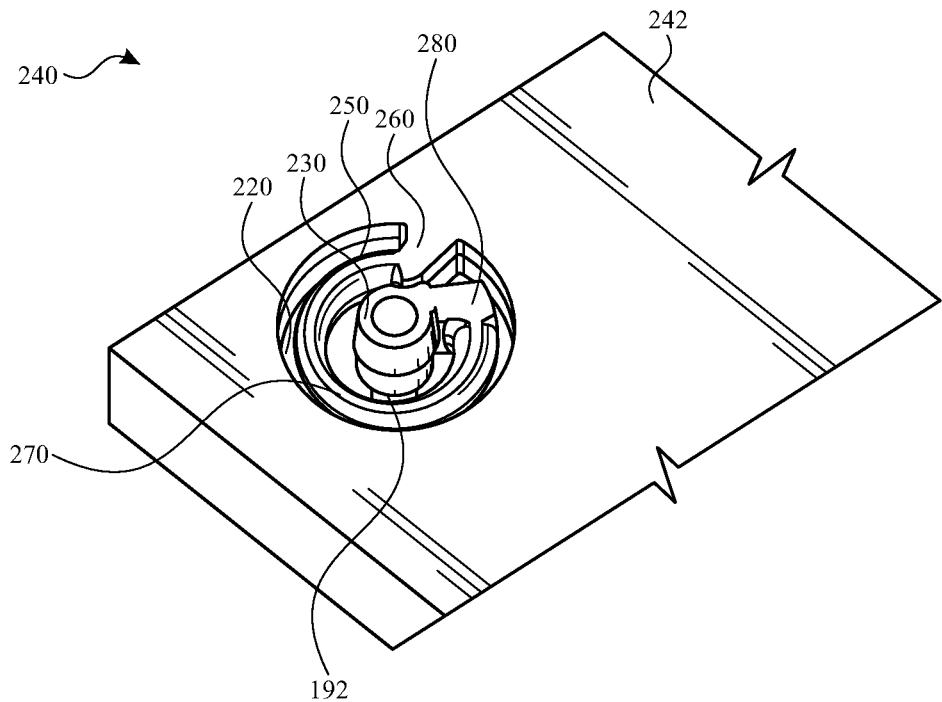
FIG. 4 illustrates an enlarged view of the speaker assembly of FIG. 3, in accordance with some embodiments of the present disclosure.

Referring now to FIG. 4, the spring element 250 can be formed in a manner that isolates the speaker assembly and effectively reduces transmission of vibrations. As shown in FIG. 4, the spring element can be at least partially formed within an opening 220 extending partially or entirely through a main body 242 of the speaker support 240. The spring element 250 can connect the main body 242 to a fastener coupling 230, which in turn facilitates securement to the chassis via a fastener 192. For example, the fastener 192 can attach to both the chassis and the fastener coupling 230. The fastener 192 can be an item (e.g., threaded screw, post, pin, and the like) that extends from the chassis to secure to the fastener coupling 230. Additionally or alternatively, the spring element 250 can provide the fastener 192 as a component thereof or an attachment thereto, and the fastener 192 can attach to the chassis.

The spring element 250 can allow the speaker support 240 to move relative to the chassis within a range of motion while the fastener 192 secures the spring element 250 to the chassis. For example, the range of motion can be parallel to a direction of movement of the speaker relative to the speaker support 240. Accordingly, as the motion of the speaker within the speaker support generates vibrations, transmission of the vibrations to the chassis can be reduced by the spring element 250, so that transmission of the vibrations is reduced or eliminated rather than being transmitted to the chassis or other components of the electronic device.

As shown in FIG. 4, the spring element 250 can suspend the fastener coupling 230 within the opening 220 provided by the speaker support 240. The spring element 250 can be attached to the main body 242 at an outer end 260. The spring element 250 can be attached to the fastener coupling 230 at an inner end 280. Between the outer end 260 and the inner end 280, the spring element 250 can provide an arm 270 that extends within the opening 220. The arm 270 can extend at least partially about the fastener coupling 230. For example, the arm 270 can extend from a given radial side of the opening 220 (e.g., at the outer end 260), about the fastener coupling 230 to an opposite radial side of the opening 220, and to the original radial side of the opening 220 (e.g., at the inner end 280). By further example, the arm 270 can extend about at least half of the fastener coupling 230. By further example, the arm 270 can have a curved shape and extend with an arc angle that is equal to or greater than 120°, 180°, 210°, 240°, 270°, 300°, 330°, or 360°. Where the arc angle exceeds 360°, the arm 270 can overlap itself in a spiral and/or helix shape. By providing a substantial length for the arm 270, any strain imposed by speaker-induced movement can be distributed along the substantial length for enhanced shock absorption.

The arm 270 can have a variable thickness along its arc length. For example, the arm 270 can form a first thickness at the outer end 260 and the inner end 280. The arm 270 can further form a second thickness at or along a segment between the outer end 260 and the inner end 280, the second thickness being less than the first thickness. For example, the arm 270 can optionally have a minimum thickness at a segment halfway between the outer end 260 and the inner end 280. At the smaller thickness portions, the arm 270 can provide greater flexibility. At the larger thickness portions, the arm 270 can provide secure attachment to the main body 242 and the fastener coupling 230.

The speaker support 240, including the main body 242 and the spring element 250, can be a monolithic structure, rather than an assembly of separate parts. As used herein, a monolithic structure is one that is integrally formed of a single piece of material, rather than of separate pieces that are joined together by an interface. For example, the main body 242 and the spring element 250, can be a unibody and/or unitary structure. By providing a monolithic, unitary, and/or unibody structure, the main body 242 and the spring elements 250 do not contain interfaces or discontinuities, such as those that occur in assembled parts. Accordingly, the monolithic, unitary, and/or unibody speaker support 240 can be fabricated to more precise and consistent dimensions as well as provide greater structural support. It will be understood that various processes can be performed to produce a monolithic structure. By way of example, a molding and/or injection process can be performed to produce a monolithic structure. By further example, multiple elements can be co-molded and/or co-injected. Such elements can include different materials, yet still produce a monolithic structure.

The speaker support 240, including the main body 242 and the spring element 250, can be of a material that provides protection to the speaker 210. The material can be plastic, metal, and/or another material. The materials can be selected to provide adequate tensile strength for stiffness and robustness, as well as adequate flexibility to reduce transmission of vibrations.

By providing a monolithic part, the speaker support 240, including the main body 242 and the spring element 250, can be formed at once. For example, the speaker support 240 can be formed in a molding process, resulting in spring elements 250 that are readily formed and ready for securement to a chassis or other component. As such, no additional shock absorbers or other components may be required for assembly and securement to the chassis, thereby reducing the additional time and expense of such additional components.

The spring element 250 can facilitate movement of the speaker support 240 relative to the chassis. For example, the spring element 250 can provide a range of motion that is parallel to the movement of the speaker, parallel to the fastener 192, and/or parallel to an axis extending through the opening 220. Such motion can offset the effect of the vibrations of the speaker at locations to which the speaker support 240 is coupled.

Additionally, the spring element 250 can facilitate movement in other directions. For example, the spring element 250 can provide a range of motion that is parallel to the top surface of the speaker support 240 and/or the chassis. Such motion can provide shock absorption in multiple axes.

The properties of the spring element 250 can be selected to reduce transmission of vibrations and provide sufficient robustness. For example, the spring element 250 can be provided with a particular material, a length (e.g., arc length) of arm, a thickness of arm, and the like to provide the desired performance characteristics. For example, the spring element 250 can be tuned to isolate the speaker assembly for particular frequencies or ranges of frequencies. Accordingly, the spring element 250 can be formed in a manner that vibrationally isolates the speaker assembly from the remainder of the electronic device as the speaker of the speaker assembly generates vibrations.

While various embodiments and aspects of the present disclosure are illustrated with respect to a laptop, it will be appreciated that the subject technology can encompass and be applied to other devices. For example, a speaker assembly and the arrangements described herein can be included with an electronic device that operates a speaker during use. Such an electronic device can be or include a desktop electronic device, a display, a television, a portable device, a phone, a tablet electronic device, a mobile electronic device, a wearable device, a watch, and/or a digital media player.

While various embodiments and aspects of the present disclosure are illustrated with respect to speakers, it will be appreciated that the subject technology can encompass and be applied to devices that generate vibrations. For example, an assembly and the arrangements described herein can be included with an electronic device that operates a fan, a hard disk drive, and the like. It will be further appreciated that the subject technology can encompass and be applied to devices that include components that are to be protected from vibrations. For example, an assembly and the arrangements described herein can be included with an electronic device that provides a sensor, where the assembly can isolate the sensor from vibrations. Such isolation can protect the sensor from long-term damage as well as improve its sensing functions.

Various examples of aspects of the disclosure are described below as clauses for convenience. These are provided as examples, and do not limit the subject technology.

Clause A: an electronic device comprising: a frame; and a speaker assembly comprising: a speaker; a monolithic speaker support surrounding the speaker, the speaker support comprising a spring element; and a fastener securing the spring element to the chassis, wherein the spring element is configured to reduce transmission of vibrations generated by the speaker to the chassis.

Clause B: a speaker assembly comprising: a speaker; a speaker support surrounding the speaker; and multiple spring elements each configured to receive one of multiple fasteners, the spring elements being configured to allow the speaker support to move relative to the fasteners within a range of motion.

Clause C: a speaker support for surrounding a speaker mounted to the speaker support, the speaker support comprising: a main body defining an opening extending through the main body; a fastener coupling within the openings; and an arm having a first end connecting to the main body and a second end connecting to the fastener coupling, the arm extending about at least half of the fastener coupling between the first end and the second end.

One or more of the above clauses can include one or more of the features described below. It is noted that any of the following clauses may be combined in any combination with each other, and placed into a respective independent clause, e.g., clause A, B, or C.

Clause 1: the spring element allows the speaker support to move relative to the chassis within a range of motion while the fastener secures the spring element to the chassis.

Clause 2: the range of motion is parallel to a direction of movement of the speaker relative to the speaker support.

Clause 3: a keyboard coupled to the speaker assembly.

Clause 4: the speaker assembly comprises: additional spring elements; and additional fasteners each securing a corresponding one of the additional spring elements to the chassis.

Clause 5: the monolithic speaker support is formed from a plastic material.

Clause 6: the speaker support comprises a main body defining multiple openings extending through the main body, wherein each of the multiple spring elements is positioned in a corresponding one of the multiple openings.

Clause 7: the speaker support comprises a main body defining multiple openings, wherein each of the multiple spring elements is positioned in a corresponding one of the openings.

Clause 8: each of the spring elements comprises: a fastener coupling within a corresponding one of the openings; and an arm having a first end connecting to the main body and a second end connecting to the fastener coupling, the arm extending about at least half of the fastener coupling between the first end and the second end.

Clause 9: each of the spring elements is monolithically formed with the speaker support.

Clause 10: the spring elements and the speaker support are formed from a plastic material.

Clause 11: the arm extends from a first side of the opening, around the fastener coupling to a second side of the opening, and to the first side.

Clause 12: the arm has a variable thickness along its length.

Clause 13: the arm forms: a first thickness at the first end and the second end along its length; and a second thickness at a segment between the first end and the second end, the second thickness being less than the first thickness.

Clause 14: the arm extends at least once about an entirety of the fastener coupling.

Clause 15: the main body, the fastener coupling, and the arm are monolithically formed together.

Clause 16: the main body further defines additional openings extending through the main body; the speaker support further comprises: additional fastener couplings, each of the additional fastener couplings being within a corresponding one of the additional openings; and additional arms, each of the additional arms connecting a corresponding one of the additional fastener couplings to the main body.

Clause 17: the main body, the fastener coupling, and the arm are formed from a plastic material.

A reference to an element in the singular is not intended to mean one and only one unless specifically so stated, but rather one or more. For example, "a" module may refer to one or more modules. An element proceeded by "a," "an,"

"the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. An electronic device comprising:
    a chassis; and
    a speaker assembly comprising:
        a speaker;
        a monolithic speaker support surrounding the speaker, the speaker support comprising a spring element; and
        a fastener securing the spring element to the chassis, wherein the spring element is configured to reduce transmission of vibrations generated by the speaker to the chassis.

2. The electronic device of claim 1, wherein the spring element allows the speaker support to move relative to the chassis within a range of motion while the fastener secures the spring element to the chassis.

3. The electronic device of claim 2, wherein the range of motion is parallel to a direction of movement of the speaker relative to the speaker support.

4. The electronic device of claim 1, further comprising a keyboard coupled to the speaker assembly.

5. The electronic device of claim 1, wherein the speaker assembly comprises:
additional spring elements; and
additional fasteners each securing a corresponding one of the additional spring elements to the chassis.

6. The electronic device of claim 1, wherein the monolithic speaker support is formed from a plastic material.

7. A speaker assembly comprising:
a speaker;
a speaker support surrounding the speaker and defining openings; and
multiple spring elements each configured to receive one of multiple fasteners, the spring elements being configured to allow the speaker support to move relative to the fasteners within a range of motion, each of the spring elements comprising:
a fastener coupling within a corresponding one of the openings; and
an arm connected to the speaker support and the fastener coupling, extending within the corresponding one of the openings and about the fastener coupling, and having a variable thickness along its length.

8. The speaker assembly of claim 7, wherein the speaker support comprises a main body defining multiple the openings extending through the main body, wherein each of the multiple spring elements is positioned in a corresponding one of the multiple openings.

9. The speaker assembly of claim 7, wherein
the arm extends about at least half of the fastener coupling.

10. The speaker assembly of claim 7, wherein each of the spring elements is monolithically formed with the speaker support.

11. The speaker assembly of claim 7, wherein the spring elements and the speaker support are formed from a plastic material.

12. A speaker support for surrounding a speaker mounted to the speaker support, the speaker support comprising:
a main body defining an opening extending through the main body;
a fastener coupling within the opening; and
an arm having a first end connecting to the main body and a second end connecting to the fastener coupling, the arm extending about at least half of the fastener coupling between the first end and the second end.

13. The speaker support of claim 12, wherein the arm extends from a first side of the opening, around the fastener coupling to a second side of the opening, and to the first side.

14. The speaker support of claim 12, wherein the arm forms:
a first thickness at the first end and the second end along its length; and
a second thickness at a segment between the first end and the second end, the second thickness being less than the first thickness.

15. The speaker support of claim 12, wherein the arm extends at least once about an entirety of the fastener coupling.

16. The speaker support of claim 12, wherein the main body, the fastener coupling, and the arm are monolithically formed together.

17. The speaker support of claim 12, wherein:
the main body further defines additional openings extending through the main body;
the speaker support further comprises:
additional fastener couplings, each of the additional fastener couplings being within a corresponding one of the additional openings; and
additional arms, each of the additional arms connecting a corresponding one of the additional fastener couplings to the main body.

18. The speaker support of claim 12, wherein the main body, the fastener coupling, and the arm are formed from a plastic material.

* * * * *